(12) United States Patent
Brück

(10) Patent No.: US 7,765,802 B2
(45) Date of Patent: Aug. 3, 2010

(54) DEVICE AND METHOD FOR THE THERMAL TREATMENT OF AN EXHAUST GAS FLOW, VEHICLE HAVING THE DEVICE AND METHOD OF OPERATING AN EXHAUST GAS SYSTEM

(75) Inventor: Rolf Brück, Bergisch Gladbach (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 12/131,527

(22) Filed: Jun. 2, 2008

(65) Prior Publication Data
US 2008/0271443 A1 Nov. 6, 2008

Related U.S. Application Data

(63) Continuation of application No. PCT/EP2006/011540, filed on Dec. 1, 2006.

(30) Foreign Application Priority Data
Dec. 1, 2005 (DE) .................. 10 2005 057 666

(51) Int. Cl.
*F01N 3/02* (2006.01)
(52) U.S. Cl. .............. 60/320; 60/274; 60/297; 60/298; 60/311
(58) Field of Classification Search ............ 60/274, 60/297, 298, 320, 311, 299
See application file for complete search history.

(56) References Cited

U.S. PATENT DOCUMENTS 5,335,492 A    8/1994    Zirkel 6,935,105 B1 *    8/2005    Page et al. .............. 60/298
2006/0096282 A1 *    5/2006    Friedrich et al. .............. 60/299
2007/0274881 A1    11/2007    Rasmussen

FOREIGN PATENT DOCUMENTS

| DE | 4218523 C1 | 4/1993 |
|---|---|---|
| DE | 4414904 C1 | 4/1995 |
| DE | 10105185 A1 | 8/2002 |
| DE | 10221174 A1 | 1/2004 |
| EP | 0504719 A1 | 9/1992 |
| EP | 1479883 A1 | 11/2004 |
| FR | 2813096 A1 | 2/2002 |
| WO | 2005052330 A1 | 6/2005 |

OTHER PUBLICATIONS

International Search Report dated Feb. 23, 2007.

\* cited by examiner

*Primary Examiner*—Thomas E Denion
*Assistant Examiner*—Diem Tran
(74) *Attorney, Agent, or Firm*—Laurence A. Greenberg; Werner H. Stemer; Ralph E. Locher

(57) ABSTRACT

A device for the treatment of an exhaust gas flow includes at least one inflow channel with a front region and a rear region and at least one return flow channel. A first coating is provided in the rear region of the at least one inflow channel. The coating assists an exothermal reaction of the exhaust gas flow. A device is formed in the front region of the inflow channel for the transfer of heat from a return flow channel. A method for operating a device for the treatment of an exhaust gas flow, a vehicle having the device and an operating method for an exhaust gas system of a vehicle having the device, are also provided.

16 Claims, 4 Drawing Sheets

DEVICE AND METHOD FOR THE THERMAL TREATMENT OF AN EXHAUST GAS FLOW, VEHICLE HAVING THE DEVICE AND METHOD OF OPERATING AN EXHAUST GAS SYSTEM

CROSS-REFERENCE TO RELATED APPLICATIONS

This is a continuation, under 35 U.S.C. §120, of copending International Application No. PCT/EP2006/011540, filed Dec. 1, 2006, which designated the United States; this application also claims the priority, under 35 U.S.C. §119, of German Patent Application DE 10 2005 057 666.4, filed Dec. 1, 2005; the prior applications are herewith incorporated by reference in their entirety.

BACKGROUND OF THE INVENTION

Field of the Invention

The present invention relates to a device and a method for the thermal treatment of an exhaust gas flow, a vehicle having the device and a method of operating an exhaust gas system, wherein the exhaust gas should be treated in a predefined temperature range.

So-called heat exchangers are known for that purpose, in which the exhaust gas is guided past a heat-exchanging surface that separates the exhaust gas flow from a heat-exchanging medium. The temperature of the exhaust gas is influenced as a result of the contact of the exhaust gas with the heat-exchanging surface. Heat exchangers of that type with a separate heat-exchanging medium often have a very complex construction and are therefore also difficult to integrate into an exhaust gas system for mobile vehicles. Furthermore, it has been found with regard to known exhaust gas treatment devices that they are partially temperature-sensitive, that is to say they generate the desired conversion of pollutants contained in the exhaust gas only in a limited temperature range.

SUMMARY OF THE INVENTION

It is accordingly an object of the invention to provide a device and a method for the thermal treatment of an exhaust gas flow, a vehicle having the device and a method of operating an exhaust gas system, which overcome the hereinafore-mentioned disadvantages and at least partially solve or minimize the above-stated technical problems of the heretofore-known devices and methods of this general type. It is intended, in particular, to specify a device for the treatment of an exhaust gas flow, which has a comparatively simple construction and at the same time permits control of the exhaust gas flow with regard to temperature without a separate heat-exchanging medium. Furthermore, it is also intended to specify a method, which generates a particularly efficient conversion of pollutants contained in the exhaust gas, which can be maintained with little expenditure.

With the foregoing and other objects in view there is provided, in accordance with the invention, a device for the treatment of an exhaust gas flow. The device comprises at least one inflow channel having a front region and a rear region, at least one return flow channel, a first coating provided in the rear region of the at least one inflow channel, the first coating assisting an exothermic reaction of the exhaust gas flow, and a device formed in the front region of the at least one inflow channel for transferring heat from the at least one return flow channel.

With regard to the construction of the inflow channel and of the return flow channel, it is preferable for them to be aligned with respect to one another according to the counterflow principle. In this case, the inflow channel and return flow channel have, in particular, the same length and extend substantially parallel to one another. The inflow channel is additionally divided into at least two partial regions, specifically a front region and a rear region. The front region is disposed close to the start of the channel and extends, in particular, from the start of the channel to the rear region. It is, however, also possible for a further partial region to be provided either upstream and/or downstream of the front region. Likewise, the rear region is disposed close to the channel end of the inflow channel, with the rear region preferably extending from the channel end into inner regions of the inflow channel.

Furthermore, a first coating is provided in the rear region of the at least one inflow channel, for assisting an exothermic reaction of the exhaust gas flow. This means, in other words, that it is, for example, possible for a coating to be provided only in the rear region, which coating has a high-grade metal catalyst, such as for example platinum, rhodium or palladium, that promotes the oxidation of constituents of the exhaust gas flow. The first coating thus motivates chemical reactions in the exhaust gas which take place with the output of heat, so that the exhaust gas flow is heated overall. It is preferable for all of the inflow channels to be formed with a corresponding rear region, that is to say to have a corresponding first coating.

A device for the transfer of heat from a return flow channel is formed in the front region of the inflow channel. This means, in other words, that the exhaust gas which is heated in the rear region of the inflow channel is guided past the front region of the inflow channel again as it is returned, with a transfer of heat taking place from the relatively hot exhaust gas in the return flow channel to the exhaust gas flow entering the inflow channel. In this case, the exothermic reaction in the rear region of the inflow channel is advantageously configured in such a way that a temperature is present in the returning exhaust gas flow which is at least 50° C. higher than that of the exhaust gas flow entering the inflow channel. A particularly simple device for realizing a transfer of heat includes a common wall composed of a good heat-conducting material, with the latter advantageously having a very low area-specific heat capacity. A wall of this type can, for example, be realized through the use of a thin metal foil.

In accordance with another feature of the invention, a supply device for the exhaust gas flow is provided in the at least one inflow channel, with a variable gas inlet location being provided. This means, in particular, that the gas inlet location is variable with regard to the regions of the inflow channel. This achieves the aim of being able to vary the temperature increase of the exhaust gas flowing into the inflow channel, by virtue of the exhaust gas flow being exposed to a greater or lesser extent to the heat transfer in the front region or also to the exothermic reaction in the rear region.

In accordance with a further feature of the invention, in this context, it is advantageous for the supply device to include a bimetal flap. A bimetal (also known as a thermal bimetal) is generally a metal strip composed of two layers of different material which are connected to one another in a cohesive or material-locking manner or in a form-locking manner. A form-locking connection is one which connects two elements together due to the shape of the elements themselves, as opposed to a force-locking connection, which locks the elements together by force external to the elements. The characteristic of this is the change in shape in the event of a temperature change. This manifests itself in a deflection. The cause for this is the different length expansion coefficients of the metals being used. The metals can, for example, be zinc and steel. A bimetal flap accordingly has the property of being intensely deformed to differing degrees as a result of different temperatures. If the inflowing exhaust gas flow is guided over a flap of that type, this generates a repeatable deformation which can be constructed in such a way that the gas inlet location is varied as a function of the deformation of the bimetal flap.

In accordance with an added feature of the invention, a second coating is provided in the at least one return flow channel. An embodiment in which all of the return flow channels of the device are formed with a second coating, is particularly preferable in this case. The second coating can be formed both in the vicinity of the front region of the inflow channel and also or alternatively in the vicinity of the rear region of the inflow channel. However, the second coating is particularly preferably disposed in a region of the return flow channel which is situated remote, in particular at least 50 mm or even 100 mm, from the gas inlet side of the hot exhaust gas.

In accordance with an additional feature of the invention, the second coating is preferably a temperature-sensitive coating. This means, in particular, that the second coating has a relatively narrow active range with regard to the occurring temperatures. Examples of a temperature-sensitive second coating of this type are coatings for the adsorption of nitrogen oxides or coatings for selective catalytic reaction (so-called SCR coatings). The region with the second coating very particularly preferably does not necessarily extend up to the gas outlet from the return flow channel, since precisely this region should be utilized at least partially for the heat transfer to the inflow channel. In this case, it is clear that further coatings or fixtures can also be provided in the return flow channel.

In accordance with yet another feature of the invention, in one advantageous refinement of the device, the front region of the inflow channel has an extent of at least 50 mm. For a particularly intimate exchange of heat, it is also possible to select greater extents, for example up to 150 mm. The extent should not be increased beyond this value since, under some circumstances, the device can otherwise no longer be of sufficiently compact construction as to be suitable for a mobile application. The extent is very particularly preferably in a range from 60 to 120 mm.

In accordance with yet a further feature of the invention, a deflecting region is provided between the at least one inflow channel and the at least one return flow channel, with at least one of the following components being disposed at least partially therein: a particle filter, a catalytic converter, a measuring sensor, a reactant inlet. With regard to the deflecting region, it is to be noted that the latter can either connect an individual inflow channel to an individual return flow channel, or it is also possible for a plurality of inflow channels to be connected to a plurality of return flow channels through the use of a common deflecting region. It is thus now possible for further components for exhaust gas treatment and/or for monitoring the exhaust gas flow to be positioned directly in the interior of the deflecting region and/or in the vicinity of the latter. A particle filter for the at least temporary retention of particles entrained in the exhaust gas flow, a catalytic converter for the catalytic conversion of constituents of the exhaust gas flow, or a reactant inlet for the addition of solid, liquid or gaseous reactants, such as for example urea, ammonia, hydrocarbons or the like which, for example, assist the processes in the return flow channel, are listed in this case by way of example. It is also proposed that a measuring sensor be provided in the deflecting region or in the vicinity thereof. The measuring sensor is embodied, in particular, as a temperature measuring sensor. The measuring sensor can be provided directly in the deflecting region, although it is also possible for the measuring sensor to be provided at least partially in the inflow channel and/or in the return flow channel.

In accordance with yet an added feature of the invention, it is also proposed that a plurality of inflow channels and a plurality of return flow channels be disposed in at least one section or tier, with the at least one section or tier being disposed so as to form a plurality of layers. The section or tier is particularly preferably formed by at least one partially structured metal foil, which separates adjacent channels. In this case, it is very particularly preferable for the inflow channels to be formed on one side of the metal foil and for the return flow channels to be formed on the other side of the metal foil. In order to construct a corresponding device, it is possible for a plurality of such sections or tiers to be stacked one on top of the other and disposed in a housing. It is, however, alternatively also possible for a single section or tier to be wound multiple times and positioned in a housing.

In accordance with yet an additional feature of the invention, there is provided a free cross section of at least 90% in the region of an inlet end side. A free cross section of at least 95% is very particularly preferable. In this case, the inlet end side is that side of the device which is, for example, approached by the flow of exhaust gas to be treated. In order to now permit a fluidically favorable approach flow behavior, it is proposed in this case, in other words, that virtually the entire inlet end side be composed of inlet openings of the inflow channels. The free cross section is composed substantially of the approach flow cross section (corresponding usually to the inlet end side or to the cross section of the line which conducts the exhaust gas to the device) minus the wall thickness of the inflow channels. A structure of the inlet end side is therefore provided which differs from the structure of the outlet end side of the device. The free cross section with respect to the outlet end side for the exhaust gas entering into the return flow channels again is thus considerably lower, for example approximately 50%.

In accordance with again another feature of the invention, it is also preferable for the at least one inflow channel to have a flow cross section which is reduced from an inlet opening to an outlet opening. This means, in other words, that the flow cross section, as viewed in the flow direction of the exhaust gas, becomes smaller in an abrupt and/or continuous fashion, advantageously limited in a small channel section. In order to realize a large free cross section in the region of the inlet end side, it is preferable for the flow cross section to be reduced in a section proceeding from the inlet opening by at least 5 mm (millimeters), in particular at least 10 mm. The reduction in the flow cross section is preferably realized through the use of the channel walls alone, although in some cases it is likewise possible for a (substantially gas-impermeable) sealing mass or the like to be provided for this purpose.

In accordance with again a further feature of the invention, a plurality of the inflow channels is surrounded by at least one return flow channel. This relates, in particular, to devices which are constructed with a multiplicity of inflow channels (and return flow channels), having for example an overall channel density over the outlet end side of at least 100 cpsi (cpsi=channels per square inch, with 1 square inch corresponding to approximately 6.4516 square centimeters), preferably even at least 200 cpsi. The configuration of the inflow channels is now such that the inflow channels are (all) surrounded, as viewed in the tangential direction of the inflow channels, by one (or more) return flow channel or channels. In this case, at least 70%, in particular at least 80%, of the periphery of one or of each inflow channel is in heat-exchanging contact with at least one return flow channel.

All of the above-specified preferred embodiment variants of the device are advantageously formed with a honeycomb body constructed from at least partially structured metal foils. A construction in which the structure of at least one metal foil is formed with a corrugation height and/or corrugation width which varies in the flow direction, is particularly preferable in this case. With the objects of the invention in view, there is also provided a method for the treatment of an exhaust gas flow. The method comprises at least:

a) supplying an exhaust gas flow into at least one inflow channel of a device for the treatment of an exhaust gas flow;
b) generating a temperature increase in the exhaust gas flow as a result of an exothermic reaction in a rear region of the inflow channel;
c) returning the exhaust gas flow in at least one return flow channel of the device for the treatment of an exhaust gas flow; and
d) generating an exchange of heat, from the exhaust gas flow in the return flow channel, to a front region of the at least one inflow channel.

The method is used, in particular, in an embodiment of the device as described herein according to the invention.

In accordance with another mode of the invention, a gas inlet location, which varies as a function of a parameter of the exhaust gas flow, is predefined with step a). This means, in particular, that the supply of the exhaust gas flow into the inflow channel can be varied, with this being carried out as a function of a parameter of the exhaust gas flow. In this case, the parameter can relate to the exhaust gas flow upstream of, in and/or downstream of the device for the treatment of the exhaust gas flow. In this case, it is particularly preferable for the dependency of a parameter of the exhaust gas flow before it enters into the device to be considered.

In accordance with a further mode of the invention, with regard to the parameter, it is proposed that the parameter be selected as at least one parameter from the following group: temperature, hydrocarbon content, carbon monoxide content, oxygen content. By taking into consideration the temperature upstream of the inlet into the device, it is possible to determine what conditions must be present in the inflow channel with regard to the exhaust gas flow in order to ensure that a predefined temperature range is present in the deflecting region or in the return flow channel. Through the use of the temperature of the exhaust gas flow in the deflecting region it is, for example, possible to check whether the predetermined or desired reactions or temperature increases are actually generated, with it being possible if appropriate for an adaptation of the gas inlet location to be carried out or initiated. In light of the fact that, in the inflow channel, the temperature increase is generated to a considerable extent on the basis of an exothermic chemical reaction, it is advisable to monitor or measure the exhaust gas flow composition with regard to the reactants contained therein in order to influence the exhaust gas composition if appropriate or/and to evaluate the reactivity of the exhaust gas flow and therefore to correspondingly adapt the gas inlet location. It is possible to use known measuring sensors to detect the parameters.

In accordance with an added mode of the invention, it is also proposed for the parameter to be calculated. This means, in particular, that the exhaust gas composition or the content of a certain component of the exhaust gas is calculated. This can be carried out, for example, through the use of a so-called untreated emissions characteristic map, from which information the untreated emissions in the exhaust gas can be determined as a function of the present operating state of the exhaust gas source. In a similar way, it is also possible for certain temperatures of the exhaust gas to be calculated. In this case, it is self-evidently nevertheless possible for a measuring sensor to be provided for checking purposes.

In accordance with an additional mode of the invention, it is also proposed that step b) be carried out in such a way that, under varying parameters of the approaching exhaust gas flow, a predetermined temperature of the exhaust gas as it leaves the inflow channel is not exceeded. It is very particularly preferable for a desired temperature span to be regulated by varying the exhaust gas composition and/or the gas inlet location. In this case, the predetermined temperature is preferably in a range of from 400° C. to 600° C. and is, in particular, independent of the operating state of the exhaust gas source. In the event that a particle trap is, for example, positioned downstream of the inflow channel, then it is possible for a continuous regeneration to be ensured through the use of the temperature. Furthermore, in the event that a temperature-sensitive, second coating is positioned downstream of the inflow channel, it is likewise the case herein that the predetermined temperature is coordinated with the active range of the second coating.

In accordance with yet another mode of the invention, it is also proposed that the parameters of the approaching exhaust gas flow be influenced by taking into consideration the prevailing conditions in the device. This means, in particular, that the reactivity with regard to the exothermic reaction of the exhaust gas in the device is measured and a corresponding adaptation, for example of the composition of the entering or approaching exhaust gas flow, is carried out. This can, for example, encompass an increase in the hydrocarbon content and/or carbon monoxide content in the exhaust gas flow, in particular by virtue of the operating mode of the exhaust gas source such as, for example, an internal combustion engine, being correspondingly altered.

With the objects of the invention in view, there is furthermore provided a combination of a device for the treatment of an exhaust gas flow according to the invention, with a vehicle.

With the objects of the invention in view, there is concomitantly provided a corresponding operating method for an exhaust gas system of a vehicle having a corresponding device for the treatment of the exhaust gas flow, as described herein according to the invention.

Other features which are considered as characteristic for the invention are set forth in the appended claims, noting that the features listed individually in the claims can be combined with one another in any desired technologically meaningful way and highlight further embodiments of the invention.

Although the invention is illustrated and described herein as embodied in a device and a method for the thermal treatment of an exhaust gas flow, a vehicle having the device and a method of operating an exhaust gas system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
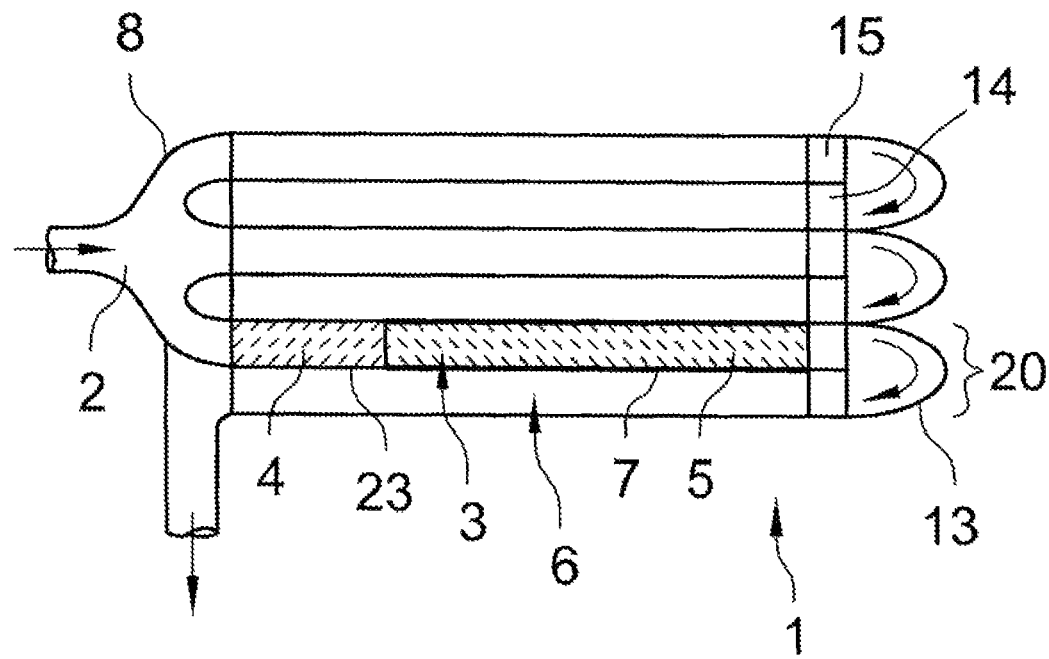
FIG. 1 is a diagrammatic, elevational view of a first embodiment variant of a device according to the invention.

Referring now to the figures of the drawings in detail and first, particularly, to FIG. 1 thereof, there is seen a first embodiment variant of a device 1 for the treatment of an exhaust gas flow 2. The device 1 includes a plurality of layers 20 each having an inflow channel 3 and a return flow channel 6 disposed in one plane. The exhaust gas flow 2 is supplied to the inflow channels 3 through a corresponding supply device 8. The exhaust gas flow 2 flows from the inflow channel 3, through a catalytic converter 15, into a deflecting region 13 and then through a particle filter 14 before the exhaust gas flow 2 finally enters into the return flow channel 6 again. The exhaust gas flow 2 from the return flow channel 6 is merged again and led to further treatment devices of an exhaust gas system.

The detailed construction of a layer 20 is shown in the lower part of FIG. 1. In this case, an inflow channel 3 is formed with a front region 4 and a rear region 5. The return flow channel 6, which is disposed directly adjacent the inflow channel 3, runs parallel thereto and has the same length. A first coating 7, which is provided in the rear region 5 of the inflow channel 3, assists an exothermic reaction of the exhaust gas flow 2 in the rear region 5. A common wall 23 is formed in the front region 4 of the inflow channel 3 as a device for transferring heat from the return flow channel 6. The function of the inflow channel 3 and of the return flow channel 6 is explained in more detail by way of example on the basis of the illustrations in FIG. 2.

Figure 2:
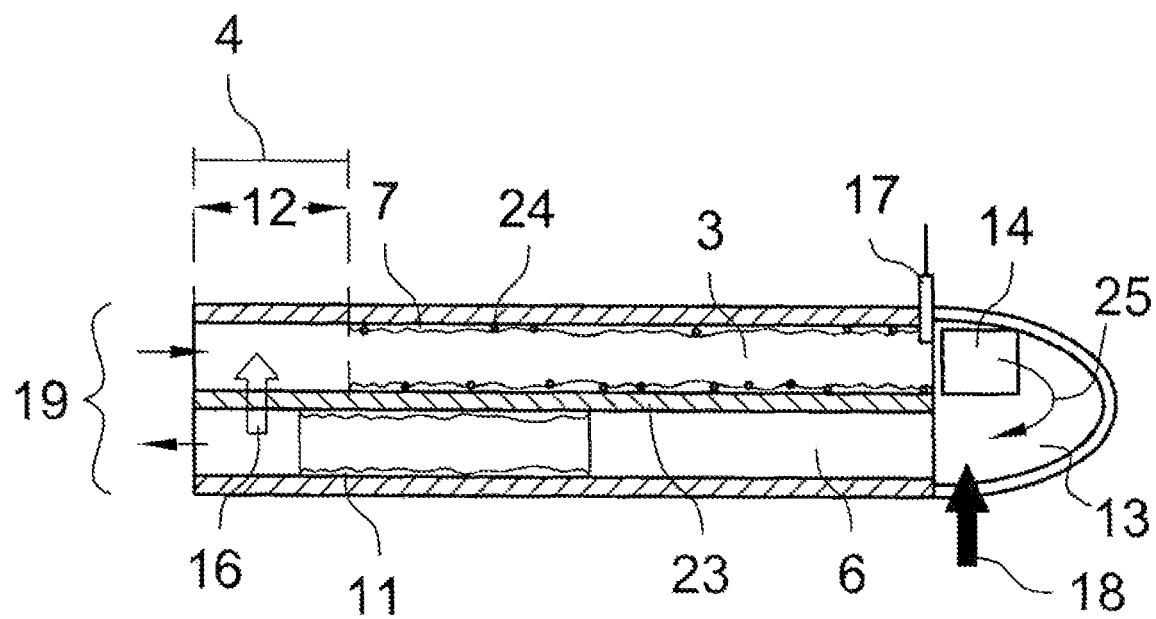
FIG. 2 is a fragmentary, longitudinal-sectional view of a further embodiment variant of the device.

FIG. 2 shows a section 19 in detail, with the inflow channel 3 being shown at the top, the return flow channel 6 being shown at the bottom and the inflow channel 3 and return flow channel 6 being spaced apart from one another by the common wall 23. The exhaust gas flows in a flow direction 25, firstly into the front region 4 of the inflow channel 3, which is formed with an extent 12 in the region of 80 to 120 mm. The front region 4 is directly adjoined by the rear region 5, which includes the first coating 7 with high-grade metal catalysts 24. An exothermic reaction of the exhaust gas, which is motivated in the rear region 5 with the first coating 7, is associated with a temperature increase of the exhaust gas flow 2. In order to check the temperature increase obtained through the exothermic reaction, a measuring sensor 17 for determining the temperature is provided at an end of the inflow channel 3 or in a transition region to the deflecting region 13. The particle filter 14 is provided at the end of the inflow channel 3 or in the deflecting region 13. The temperature of the exhaust gas flow is regulated in such a way that the particle filter 14 is continuously regenerated. After flowing through the particle filter 14, the exhaust gas flows onward in the flow direction 25 to the return flow channel 6. Reactant, such as for example solid urea, is added through the use of a reactant inlet 18 upstream of the inlet into the return flow channel 6. A second coating 11, for example an SCR coating, is provided in the return flow channel 6 (specifically from the inflow region to the outflow region). The still relatively hot exhaust gas flows past the wall 23, downstream of the section with the second coating 11, in such a way that an exchange of heat 16 takes place in the front region 4 of the inflow channel 3.

Figure 3:
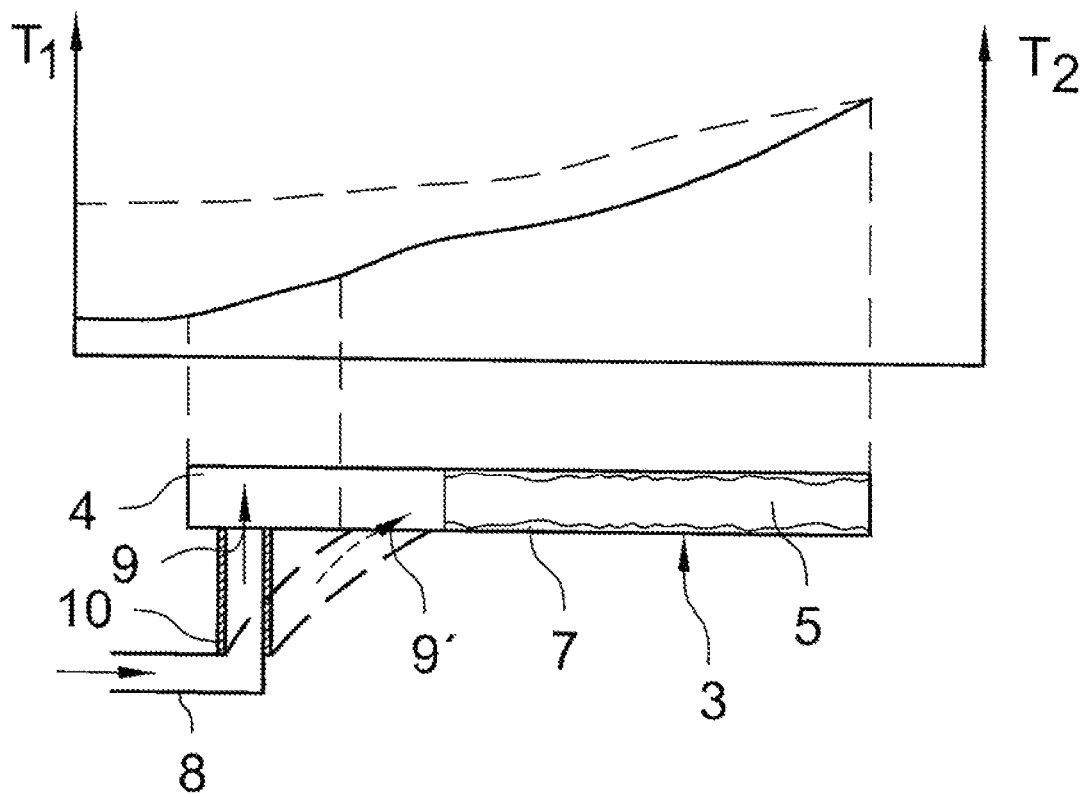
FIG. 3 is an elevational view of an inflow channel as well as a diagram of a temperature profile of exhaust gas as it flows through the inflow channel.

The influence of a gas inlet location 9 with regard to the inflow channel 3 will be explained in more detail on the basis of FIG. 3. The top of FIG. 3 illustrates a diagram graphically showing the temperature profile of the exhaust gas flow upstream of, within and after leaving the inflow channel 3. In this case, T1 denotes the temperature which the exhaust gas flow 2 has before it enters into the inflow channel 3. Correspondingly, T2 describes the temperature which the exhaust gas flow has as it leaves or after it has left the inflow channel 3.

The inflow channel 3 itself is shown diagrammatically below the diagram. The inflow channel 3 has the front region 4 at the left-hand side and the rear region 5 at the right-hand side, with the rear region 5 being formed with the first coating 7. The supply device 8 for the exhaust gas flow 2 projects into the front region 4 of the inflow channel 3, with the supply device 8 including bimetal flaps 10 which determine the gas inlet location 9. The embodiment variant of the supply device 8 or of the gas inlet location 9 is set, for example, in a "normal mode" of an internal combustion engine. In this case, the exhaust gas flows at a relatively low temperature T1 into the front region 4, with the exhaust gas undergoing a first temperature increase due to the heat transfer from the non-illustrated return channel. Directly after this, the exhaust gas flows through the rear region 5 with the first coating 7, with a further temperature increase being generated as a result of the exothermic reaction in such a way that a determined or predefined temperature T2 is ultimately obtained.

However, under certain operating conditions of the internal combustion engine which produces the exhaust gas, it is advantageous to obtain different thermal treatment of the exhaust gas. It is, for example, possible during a cold-start phase of an internal combustion engine of this type or else in the event of increased inlet temperatures T1 of the exhaust gas flow, to select a different gas inlet location 9'. This is shown in FIG. 3 by the embodiment of the gas inlet location 9' shown by dashed lines and the profile in the diagram illustrated by dashed lines. In this case, the temperature T1 is now considerably higher. In order to obtain substantially the same end temperature T2, the gas inlet location 9' is displaced more toward the rear region 5 of the inflow channel 3, in such a way that, for example, a part of the exchange of heat with the return flow channel does not take place or even a part of the first coating 7 is not utilized.

In this case, it is preferably possible for at least two gas inlet locations 9 to be realized, although it is also advantageous under some circumstances for the gas inlet location 9 to be adjustable in a continuously variable manner.

Figure 4:
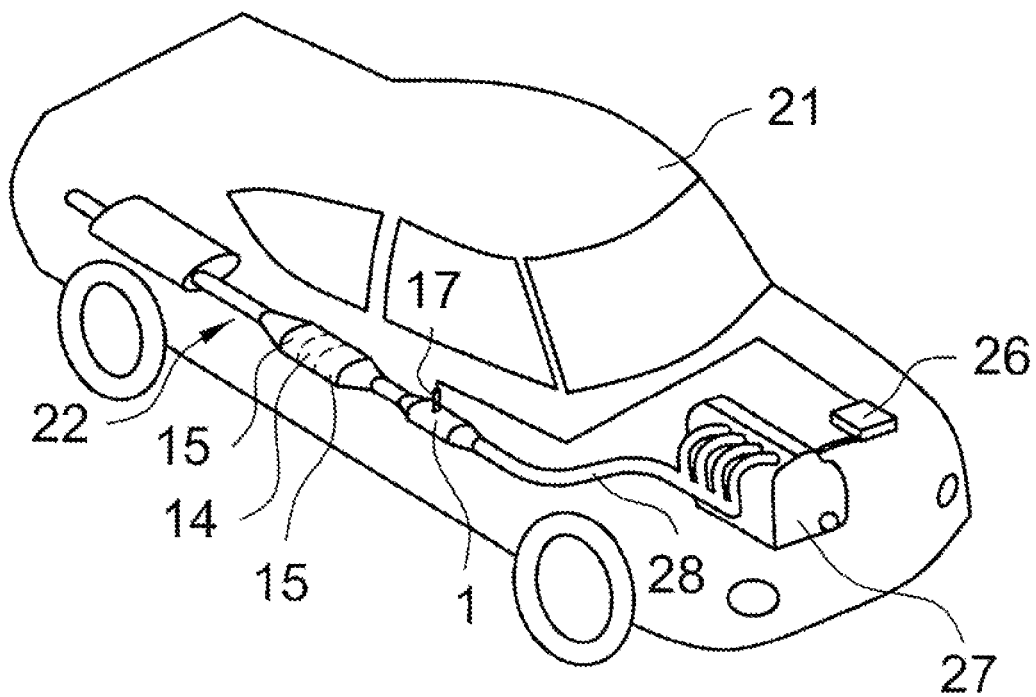
FIG. 4 is a perspective view of a vehicle having an exhaust gas system.

FIG. 4 shows a preferred application of the device and of the method. The figure shows a vehicle 21 having an exhaust gas system 22. The vehicle 21 has an internal combustion engine 27 (for example a spark-ignition engine or diesel engine) which produces the exhaust gas flow that is to be purified. The exhaust gas flow flows through an exhaust gas line 28 to the device 1 according to the invention, with the method according to the invention being carried out there. The measuring sensor 17 for determining the temperature of the exhaust gas is provided in order to monitor the processes in the device 1. In the event that the temperature measured by the measuring sensor 17 does not lie in the desired range it is, for example, possible for the composition of the exhaust gas flow to be influenced with regard to the reactants contained therein through the use of a corresponding engine controller 26.

After leaving the device 1, the exhaust gas flows through further exhaust gas treatment units such as, for example, the catalytic converter 15 for the oxidation of a constituent of the exhaust gas flow, the particle filter 14 and a further exhaust gas treatment unit such as, for example, another catalytic converter 15 for the reduction of another constituent of the exhaust gas flow. After the purification or conversion of the exhaust gas flow, the latter can be discharged to the atmosphere.

Figure 5:
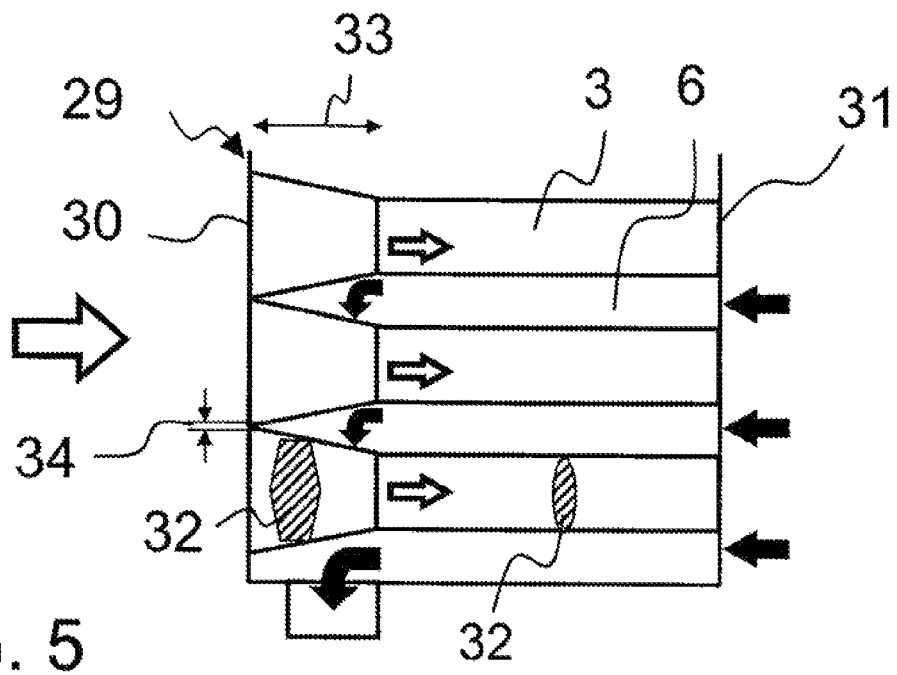
FIG. 5 is a fragmentary, elevational view of a further embodiment variant of the device.

FIG. 5 diagrammatically shows the construction of a device in which a free cross section of at least 90% is provided in the region of an inlet end side 29. As can be seen from the figure, the inlet end side 29 is reduced only by a wall thickness 34 of the channels. In order to place the inflow channels 3 adjacent the return flow channels 6 proceeding from the inlet end side 29, a flow cross section 32 of the inflow channels 3 is reduced from an inlet opening 30 to an outlet opening 31. In the illustrated embodiment variant, this takes place continuously across a section 33 which adjoins the inlet end side 29. The shape of the flow cross section 32 of the inflow channel 3 can fundamentally also vary, for example from polygonal to semi-circular or the like, as is also indicated in this case. The measures used in this case contribute, in particular, to the device having inflow channels 3 which are (all) surrounded by a plurality of return flow channels 6, in such a way that the device is constructed in the manner of a tube-bundle heat exchanger.

Figure 6:
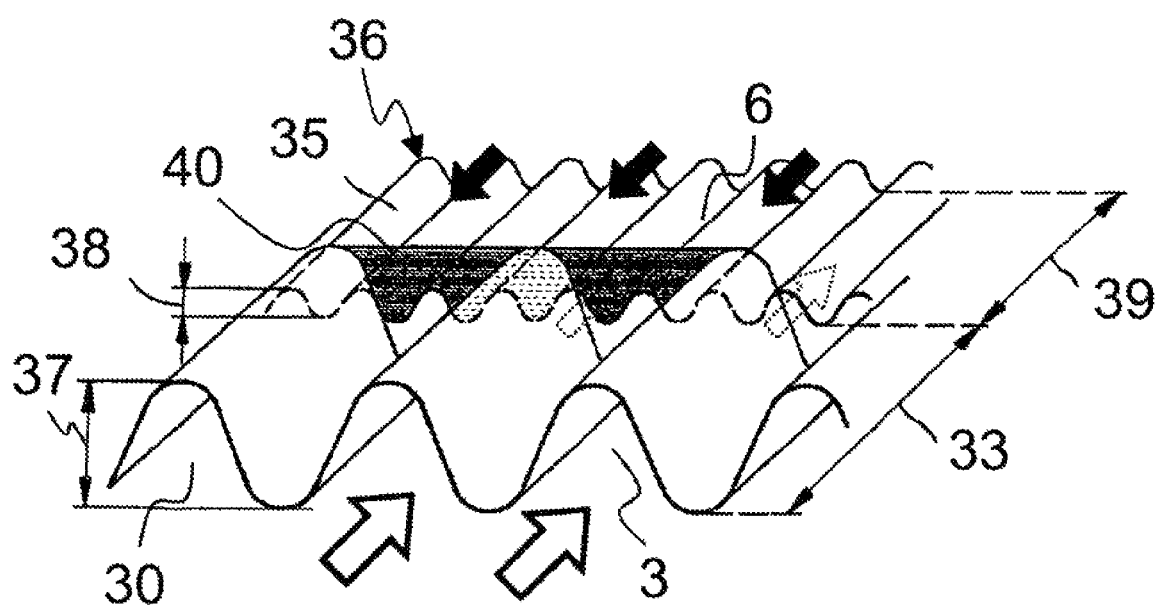
FIG. 6 is a perspective view of a configuration including a metal foil for forming a further embodiment variant of the device.

FIG. 6 illustrates an example of the basic structure of the above-described embodiment variant, which is constructed with metal foils 35. In this case, the metal foil 35 has a corrugated structure 36 which substantially delimits the channels, if appropriate together with a non-illustrated adjoining smooth metal foil. The large free cross section in the region of the inlet end side 29 is realized in this case through the use of a first structure height 37. In the section 33 downstream of the inlet end side 29, the flow cross section of the inflow channel 3 is reduced abruptly. This takes place by using a second structure height 38 of the metal foil 35 and a sealing device 40 which deflects the inflowing exhaust gas into the (lower) inflow channels 3 in the region of a heat-exchanging path 39. In this case, the return flow channels 6 are formed above the metal foil 35 in the region of the heat-exchanging path 39. It is pointed out in this case that the dimensional ratios illustrated are often not to scale. In particular, the heat-exchanging path 39 is considerably larger than the section 33, which is approximately 5 mm to 10 mm. The hydraulic diameter of the inflow channels 3 in the region of the heat-exchanging path 39 is preferably 1 to 4 mm, in particular 2 to 3 mm.

Figure 7:
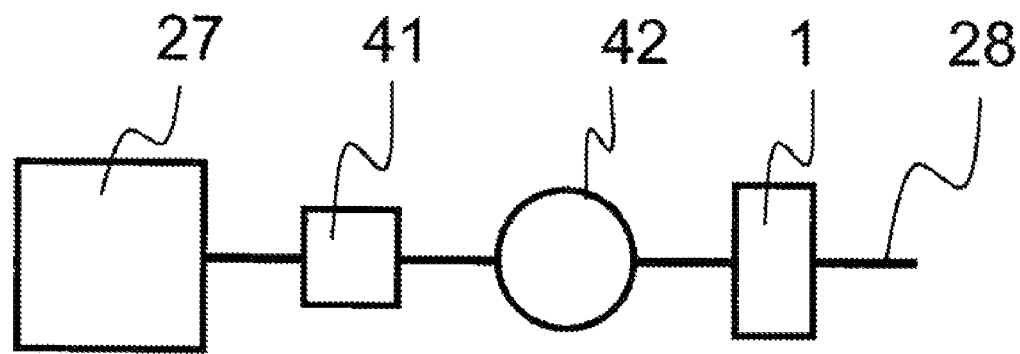
FIG. 7 is a block diagram of an exhaust gas system of a vehicle according to a preferred embodiment variant.
Figure 8:
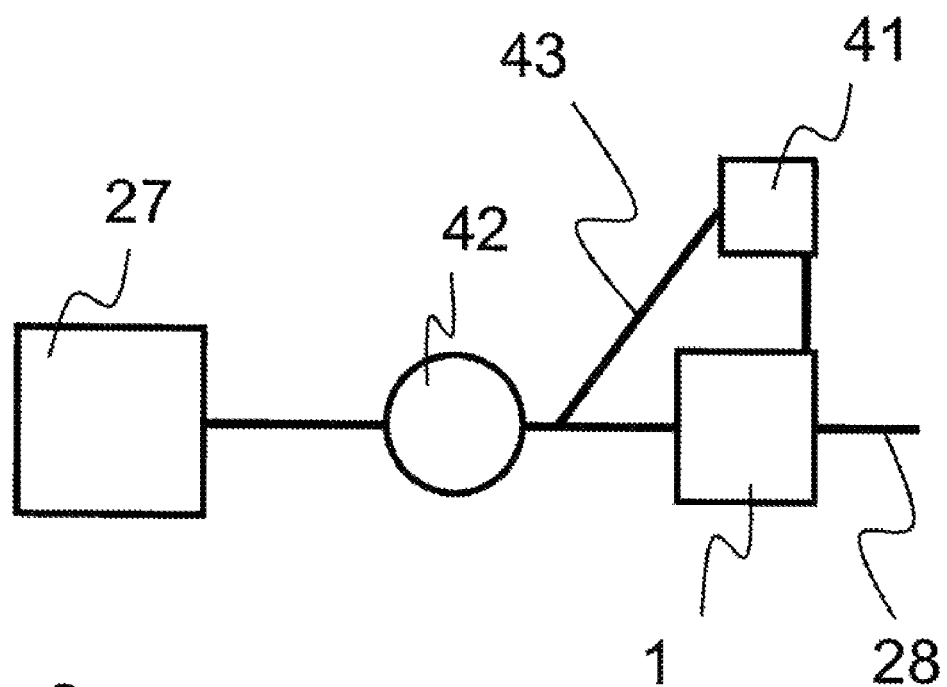
FIG. 8 is a block diagram of an exhaust gas system corresponding to a further embodiment variant.

FIGS. 7 and 8 relate to two particularly preferred embodiment variants of a mobile exhaust gas system for motor vehicles, with an improved cold-start behavior being permitted. In this case, it is proposed according to FIG. 7 that the exhaust gas passing from the internal combustion engine 27 is firstly supplied to a small-volume oxidation catalytic converter 41, where the untreated emissions, which still occur to a low extent in this case, are converted and a considerable increase in the exhaust gas temperature is generated. The exhaust gas subsequently flows, if appropriate, through a turbocharger 42, which is positioned in the exhaust gas line 28 before the exhaust gas reaches the device 1 according to the invention. In the variant shown in FIG. 8, a bypass 43 past the device 1 is provided, in which the exhaust gas is likewise supplied to an oxidation catalytic converter 41. The "preheated" exhaust gas is then preferably guided into at least a part of the return flow channels in order to heat up the device 1. Once the start temperature of the device 1 is reached, the exhaust gas flow can be guided into the inflow channels of the device 1.

The above explanations should not restrict the invention. In particular, it should be possible for technical details which have been explained with reference to one figure to likewise be integrated into embodiment variants that are shown in other figures. The device described in this case and the described method permit a particularly compact and simple construction of a corresponding device for influencing the temperature of the exhaust gas flow and for the simultaneous purification of the exhaust gas flow.

The invention claimed is:

1. A device for the treatment of an exhaust gas flow, the device comprising:
    at least one inflow channel having a front region and a rear region;
    at least one return flow channel;
    a first coating provided in said rear region of said at least one inflow channel, said first coating assisting an exothermic reaction of the exhaust gas flow;
    a device formed in said front region of said at least one inflow channel for transferring heat from said at least one return flow channel into said front region; and
    a supply device disposed in said at least one inflow channel and having a variable gas Inlet location for varying a temperature increase of the exhaust gas flowing into said at least one inflow channel.

2. The device according to claim 1, wherein said supply device includes a bimetal flap.

3. The device according to claim 1, which further comprises a second coating disposed in said at least one return flow channel.

4. The device according to claim 1, wherein said front region has an extent of at least 50 mm.

5. The device according to claim 1, which further comprises a deflecting region disposed between said at least one inflow channel and said at least one return flow channel, said deflecting region having at least one component therein selected from the group consisting of a particle filter, a catalytic converter, a measuring sensor and a reactant inlet.

6. The device according to claim 1, which further comprises at least one section having a plurality of inflow channels and a plurality of return flow channels disposed therein, said at least one section forming a plurality of layers.

7. The device according to claim 1, which further comprises an inlet end side having a free cross section of at least 90% in the vicinity thereof.

8. The device according to claim 1, wherein said at least one inflow channel has an inlet opening, an outlet opening and a flow cross section being reduced from said inlet opening to said outlet opening.

9. The device according to claim 1, wherein a plurality of said inflow channels is surrounded by at least one return flow channel.

10. A method for the treatment of an exhaust gas flow, the method comprising the following steps:
   a) supplying an exhaust gas flow into at least one inflow channel of a device for the treatment of an exhaust gas flow by varying a gas inlet location to vary a temperature increase of the exhaust gas flowing into the at least one inflow channel;
   b) generating a temperature increase in the exhaust gas flow as a result of an exothermic reaction in a rear region of the inflow channel;
   c) returning the exhaust gas flow in at least one return flow channel of the device for the treatment of an exhaust gas flow; and
   d) generating an exchange of heat, from the exhaust gas flow in the return flow channel, to a front region of the at least one inflow channel.

11. The method according to claim 10, which further comprises selecting the parameter of the exhaust gas flow as at least one parameter from the group consisting of temperature, hydrocarbon content, carbon monoxide content and oxygen content.

12. The method according to claim 10, which further comprises calculating the parameter.

13. The method according to claim 10, which further comprises carrying out step b) to prevent a predetermined temperature of the exhaust gas as it leaves the inflow channel from being exceeded, under varying parameters of the approaching exhaust gas flow.

14. The method according to claim 10, which further comprises influencing parameters of the approaching exhaust gas flow while taking prevailing conditions in the device into consideration.

15. A vehicle, comprising a device for the treatment of an exhaust gas flow according to claim 1.

16. An operating method for an exhaust gas system of a vehicle, the method comprising the following steps:
   providing a device for the treatment of an exhaust gas flow according to claim 1;
   supplying the exhaust gas flow into the at least one inflow channel of the device for the treatment of an exhaust gas flow by varying a gas inlet location to vary a temperature increase of the exhaust gas flowing into the at least one inflow channel;
   generating a temperature increase in the exhaust gas flow as a result of an exothermic reaction in the rear region of the inflow channel;
   returning the exhaust gas flow in the at least one return flow channel of the device for the treatment of an exhaust gas flow; and
   generating an exchange of heat, from the exhaust gas flow in the return flow channel, to the front region of the at least one inflow channel.

\* \* \* \* \*